US012620735B2

(12) United States Patent
Reis et al.

(10) Patent No.: US 12,620,735 B2
(45) Date of Patent: May 5, 2026

(54) HIGH CURRENT PRINTED CIRCUIT BOARD MOUNT TERMINAL FOR MAGNETIC OR LEADED COMPONENTS

(71) Applicant: BorgWarner US Technologies LLC

(72) Inventors: Alexandre M S Reis, Westfield, IN (US); Bryan Alan Rohl, Westfield, IN (US); Thomas Alan Degenkolb, Noblesville, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 312 days.

(21) Appl. No.: 18/318,503

(22) Filed: Jun. 6, 2023

(65) Prior Publication Data

US 2024/0413551 A1 Dec. 12, 2024

(51) Int. Cl.
*H01R 12/71* (2011.01)
*H01R 12/58* (2011.01)
*H01R 12/72* (2011.01)

(52) U.S. Cl.
CPC ........... *H01R 12/716* (2013.01); *H01R 12/58* (2013.01); *H01R 12/724* (2013.01); *H01R 2201/26* (2013.01)

(58) Field of Classification Search
CPC .. H01R 12/714; H01R 12/716; H01R 12/718; H01R 12/51–585
USPC ............................................................ 439/74
See application file for complete search history.

(56) References Cited

U.S. PATENT DOCUMENTS

| | | | | |
|---|---|---|---|---|
| 2004/0161975 | A1 | 8/2004 | Sakai et al. | |
| 2012/0129362 | A1 | 5/2012 | Hampo et al. | |
| 2019/0097331 | A1 | 3/2019 | Smith et al. | |
| 2019/0267731 | A1* | 8/2019 | Dauth | H05K 1/181 |
| 2020/0052426 | A1* | 2/2020 | Mortain | H01R 12/718 |
| 2022/0255252 | A1* | 8/2022 | Cano Salomo | H01R 12/55 |

FOREIGN PATENT DOCUMENTS

| | | | |
|---|---|---|---|
| DE | 102004022791 | A1 | 1/2007 |
| DE | 102018005359 | A1 | 1/2020 |
| DE | 102019214012 | A1 | 3/2021 |
| EP | 0527243 | A1 | 2/1993 |

OTHER PUBLICATIONS

EP Application No. 24176219.4 Extended European Search Report, Issued Feb. 3, 2025, 12 pages.

* cited by examiner

*Primary Examiner* — Abdullah A Riyami
*Assistant Examiner* — Amara Anderson
(74) *Attorney, Agent, or Firm* — Dickinson Wright PLLC

(57) ABSTRACT

A terminal for a printed circuit board includes a body and a plurality of leads extending from the body at an angle between 180 degrees and 90 degrees relative to a horizontal plane of the body, each lead of the plurality of leads being configured to: mate with a corresponding mounting location on the printed circuit board; and receive current from at least one electrical component associated with the printed circuit board, wherein the current flows from the at least one electrical component via the plurality of leads to at least one other electrical component.

20 Claims, 9 Drawing Sheets

HIGH CURRENT PRINTED CIRCUIT BOARD MOUNT TERMINAL FOR MAGNETIC OR LEADED COMPONENTS

TECHNICAL FIELD

This disclosure relates to electrical terminals, and in particular, systems and methods for providing a magnetic high current printed circuit board mount terminal.

BACKGROUND

Vehicles, such as cars, trucks, sport utility vehicles, cross-overs, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

Typically, such electrical components may be mounted on and/or connected via a printed circuit board (PCB). The printed circuit board may include a plurality of mounting locations, vias, and the like. The printed circuit board may be configured to electrically connect, using various terminals, connectors, connecting material, and the like, the electrical components.

SUMMARY

This disclosure relates generally to electrical component terminals for printed circuit boards.

An aspect of the disclosed embodiments includes a terminal for a printed circuit board. The terminal includes a body and a plurality of leads extending from the body at an angle between 180 degrees and 90 degrees relative to a horizontal plane of the body, each lead of the plurality of leads being configured to: mate with a corresponding mounting locations on the printed circuit board; and receive current from at least one electrical component associate with the printed circuit board, wherein the current flows from the at least one electrical component via the plurality of leads to at least one other electrical component.

Another aspect of the disclosed embodiments includes a system. The system includes a printed circuit board that includes a plurality of mounting locations, a body and a plurality of leads extending from the body at an angle between 180 degrees and 90 degrees relative to a horizontal plane of the body. Each lead of the plurality of leads is configured to: mate with respective mounting locations of the plurality of mounting locations on the printed circuit board; and receive current from at least one electrical component associate with the printed circuit board, wherein the current flows from the at least one electrical component via the plurality of leads to at least one other electrical component.

Another aspect of the disclosed embodiments includes an apparatus. The apparatus includes a body that includes at least one anti-rotation feature configured to engage a corresponding portion of a printed circuit board. The apparatus also includes a plurality of leads extending from the body and configured to: mate with corresponding mounting locations on the printed circuit board; and receive current from at least one electrical component associate with the printed circuit board, wherein the current flows from the at least one electrical component via the plurality of leads to at least one other electrical component.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, typically include various electric components, such as motors (e.g., permanent magnet motors or other suitable electric motors), batteries, battery chargers, and the like. Such electric components may be used for various aspects of vehicle control or operation, such as vehicle prolusion or other suitable aspects of vehicle control or operation.

Such electrical components may be mounted on and/or connected via a PCB. The printed circuit board may include a plurality of mounting locations, vias, and the like. The printed circuit board may be configured to electrically connect, using various terminals, connectors, connecting material, and the like, the electrical components.

Increasingly, relatively high current, relatively high power density, and elevated heatsink or ambient temperatures operation of power electronic products, such as on board chargers for vehicle batteries, direct current to direct current (DCDC) converters, inverters and the like are becoming more common in vehicle electronic systems and other suitable electrical applications. Typically, a PCB is used to connect active and/or passive components to various electrical circuits. High current generation may create potential component connection issues to PCBs due to manufacturing constrains on soldering processes and/or materials. The lack or minimized component connections to the PCB creates hotspots, yielding elevated localized temperatures that may increase both the PCB and component operating temperatures, thereby decreasing system efficiency due to higher loss and/or potential failure over time.

Figure 3B:
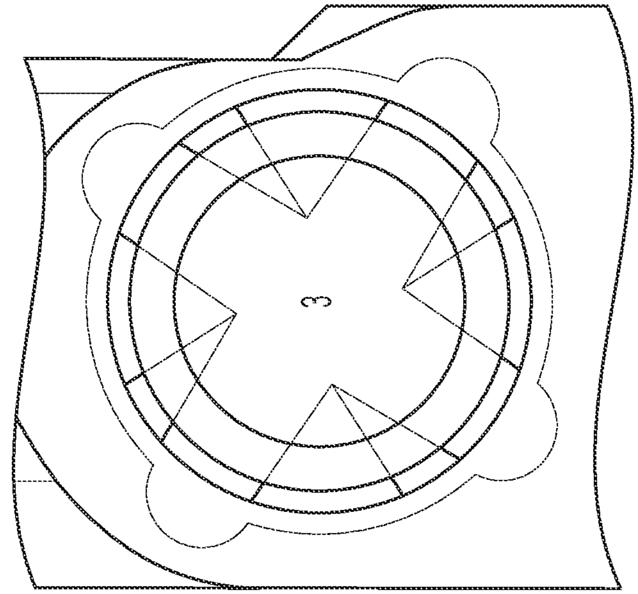
FIGS. 3A and 3B generally illustrate an electrical connection according to the principles of the present disclosure.
Figure 3A:
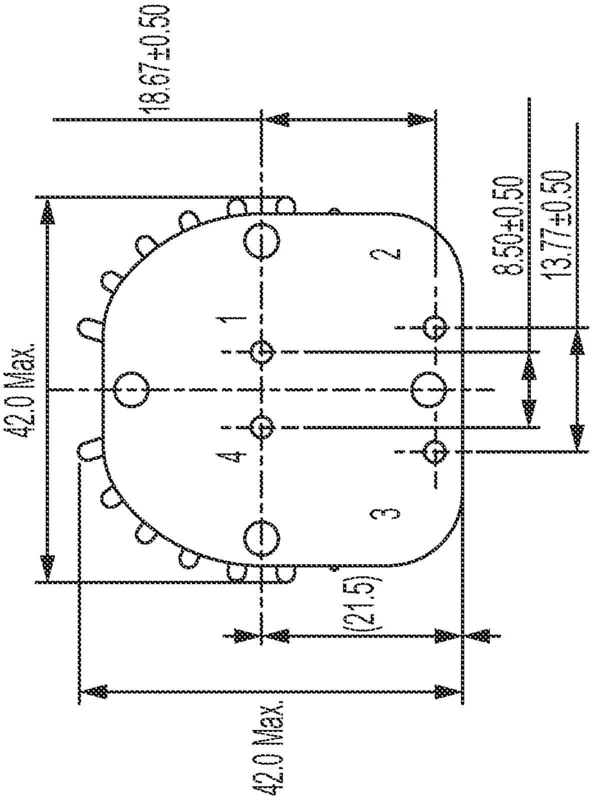

FIGS. 3A and 3B, generally illustrate an example common mode/differential mode choke. Wire is terminated into a plastic type material base plate that holds it to a specific location. FIG. 3B shows an example of the choke terminal connection to the PCB. Due to solderability constrains of manufacturing, thermal ties are used in place of buried connections to facilitate soldering. From an electrical perspective, the connection is downgraded due to loss of copper that caries the current to or from the PCB to the choke, which may create hotspots.

Accordingly, systems and methods, such as those described herein, configured to provide a terminal that reduces or controls electrical component (e.g., including, but not limited to, magnetic or leaded components) connection temperatures (e.g., and reduces or eliminates hotspots), may be desirable. In some embodiments, the systems and methods described herein may be configured to provide a terminal that splits a single connection to multiple connections between an electrical component and the PCB.

In some embodiments, a terminal for a printed circuit board includes a body and a plurality of leads extending from the body at an angle between 180 degrees and 90 degrees relative to a horizontal plane of the body. Each lead of the plurality of leads may be configured to mate with a corresponding mounting locations on the printed circuit board, and receive current from at least one electrical component (e.g., which may include a magnetic component, a leaded component, and/or the like) associate with the printed circuit board. The current may flow from the at least one electrical component via the plurality of leads to at least one other electrical component.

In some embodiments, the at least one electrical component includes a power supply and/or other suitable electrical component. In some embodiments, the at least one other electrical component includes a choke inductor, a capacitor, a resistor, any other suitable electrical component, or a combination thereof. In some embodiments, the plurality of leads includes two leads, three leads, four leads, five leads, six leads, or any suitable number of leads In some embodiments, the printed circuit board is associated with an on board charger associated with a vehicle battery. In some embodiments, the printed circuit board is associated with a direct current to direct current converter. In some embodiments, the printed circuit board is associated with an inverter. In some embodiments, the body includes an anti-rotation feature of the body, and wherein the anti-rotation feature is configured to align the plurality of leads with the mounting locations of the printed circuit board by engaging a corresponding portion of the printed circuit board. In some embodiments, the body, the plurality of leads, and the anti-rotation feature comprise a unitary component.

Figure 1:
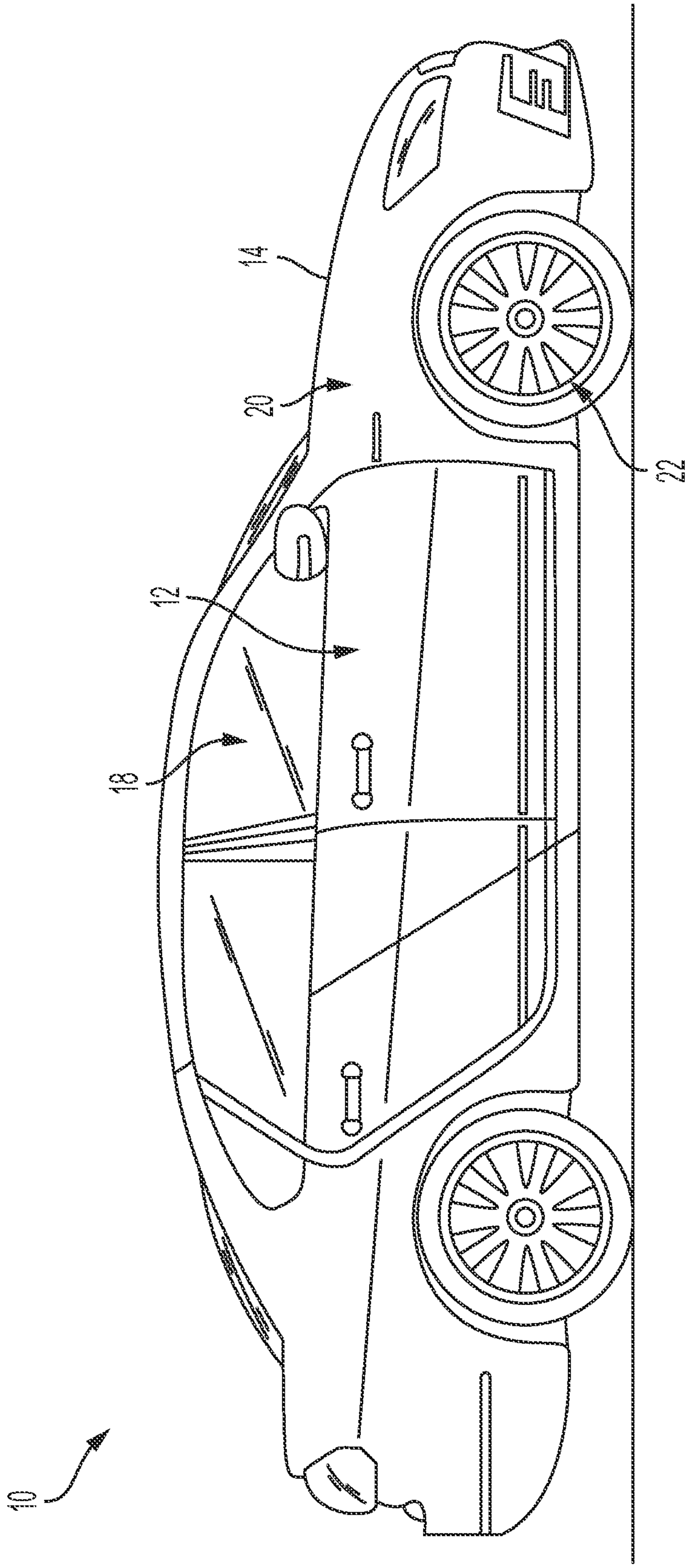
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
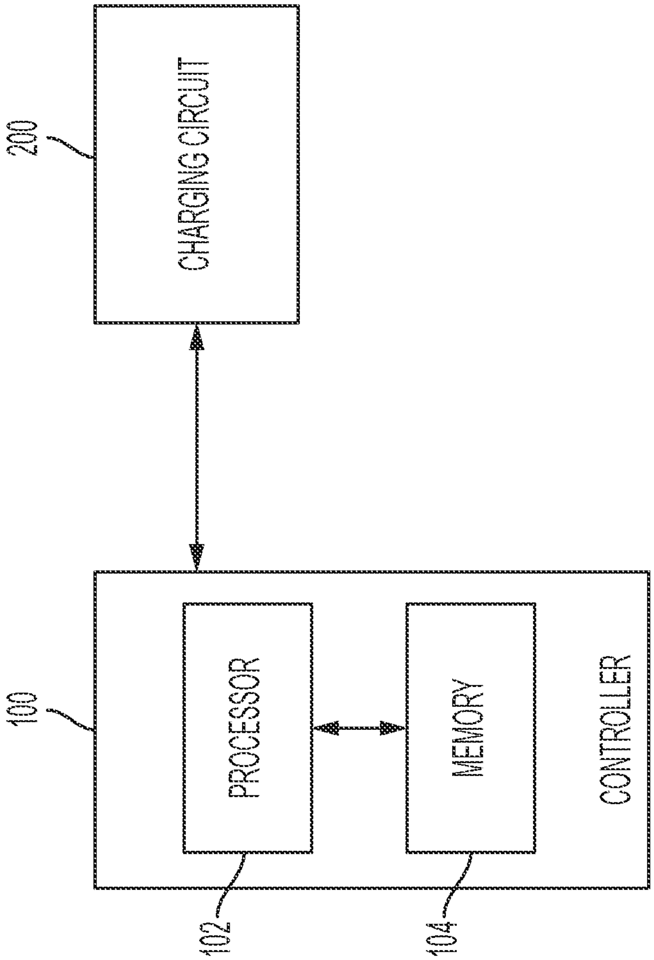
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10 and/or perform various aspects of the systems and methods described herein.

The controller 100 may be in communication with a charging circuit 200. The charging circuit 200 may be configured to charge at least one high voltage (HV) battery of the vehicle 10, The circuit 200 (e.g., which may be referred to as an OBC) may be configured to transfer energy from an electrical grid to the HV battery (e.g., which may include any suitable capacity such as 400 volts, 900 volts, and/or the like).

Figure 4C:
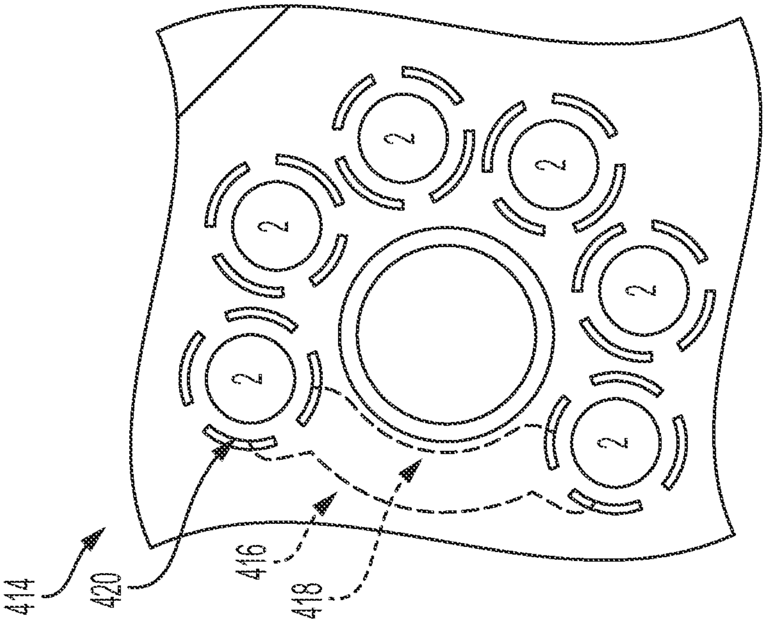
FIGS. 4A-4C generally illustrate a terminal according to the principles of the present disclosure.
Figure 4B:
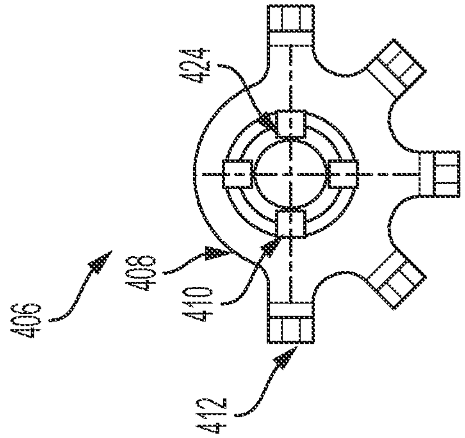
Figure 4A:
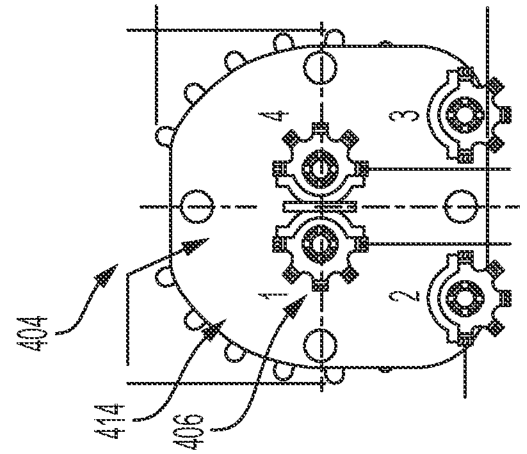

The charging circuit 200 may include a plurality of electrical components, such as inductors, capacitors, resistors, and the like electrically connected using one or more PCBs. With reference to FIGS. 4A-9, one or more of the electrical components may be connected to a portion of a corresponding PCB, such as the portion 416 of PCB 414, using a terminal 406. FIG. 4A generally illustrates a modified choke 404 using a plurality of terminals 406 to comment various electrical components of the choke 404 via the PCB 414.

The terminal 406 may include a body 408 and a plurality of leads 412 extending from the body at a suitable angle, such as an angle between 180 degrees and 90 degrees relative to a horizontal plane of the body or any other suitable angle. The plurality of leads 412 may include any suitable number of leads, such as two, three, four, five, six, or any other suitable number. In some embodiments, the terminal 406 may include a signal lead 412. Each lead of the plurality of leads 412 may be configured to mate with a corresponding mounting locations 420 on the PCB 414. For example, a lead 412 may be inserted in to a hole or opening in the PCB 414 at a corresponding mounting location 420. The lead 412 may be coupled, connected, secured, or otherwise attached to the PCB 414 via a connecting material, such as solder or other suitable material, at the corresponding mounting location 420. It should be understood that the leads 412 may be connected to the PCB 414 at the mounting locations 420 using any suitable technique instead of or in addition to those described herein.

Figure 5:
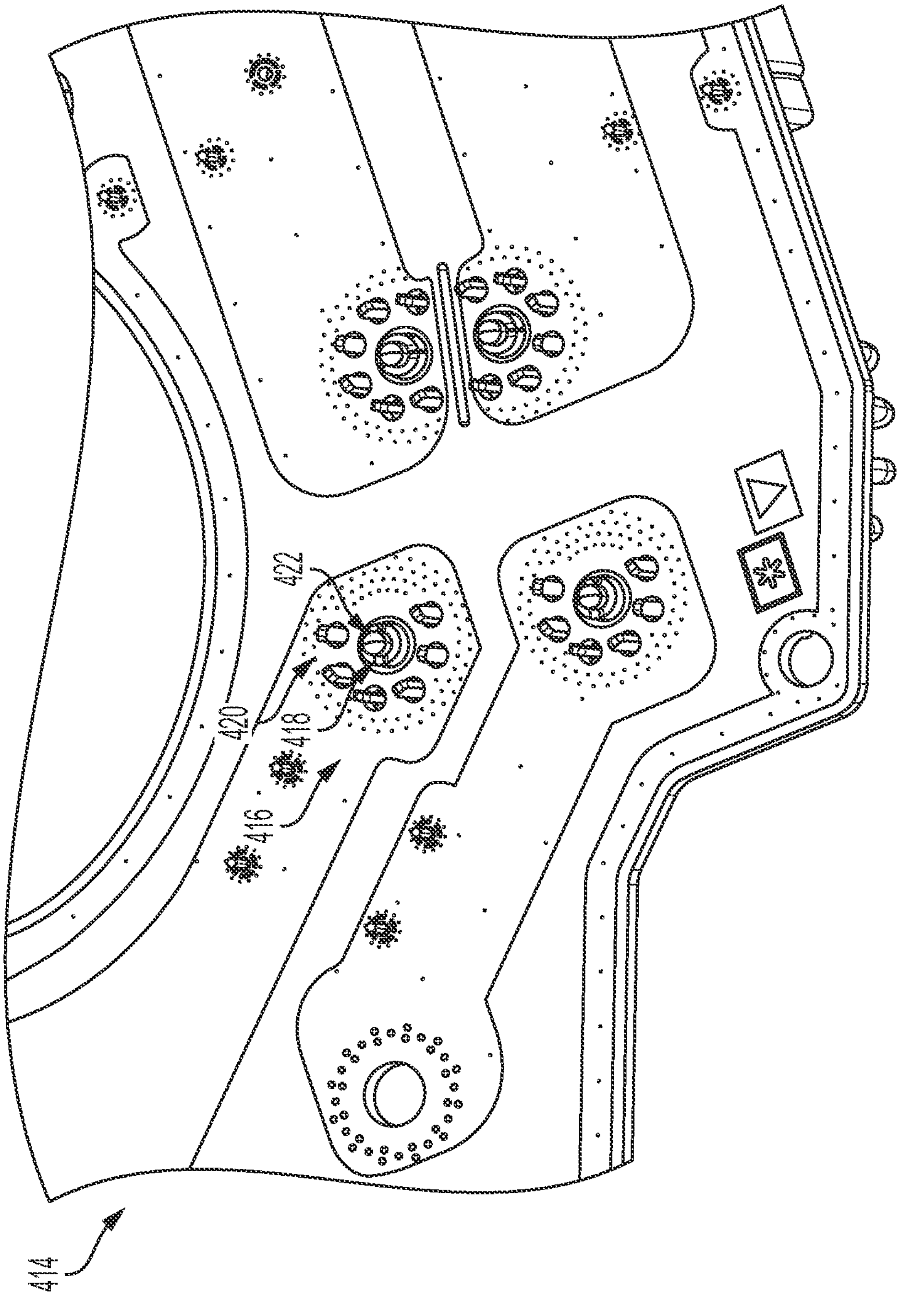
FIG. 5 generally illustrates an alternative view of the terminal of FIGS. 4A-4C.

Each lead 412 may be configured to receive current from at least one electrical component associate with the PCB 414. For example, a power supply, battery, or other suitable electrical component may provide current to various components of the PCB 414. The current may flow through each lead 412 to an electrical component connected to the terminal 406. For example, as is generally illustrated in FIG. 5, an electrical component lead 422 may pass through a central bore 424 in body 408 of the terminal 406. This may allow the current to and from the PCB 414 to the component lead 422 such that the current is split among the leads 412. For example, for a terminal 406 having six leads 412, the current at each lead 412 is ⅙$^{th}$ or substantially ⅙$^{th}$ of the total current flowing to the terminal 406. This may create a relatively larger connection (e.g., or may reduce connection resistance) from the PCB 414 to the component lead 422, thereby yielding a reduction or elimination of the PCB 414 hotspots. It should be understood that, while a choke 402 is generally described and illustrated, the terminal 406 and/or any terminals described herein may be used with any suitable electrical component, such as inductors, capacitors, resistors, power supplies, and/or the like. Additionally, or alternatively, while the terminal 406 or any terminals described herein may be used in any suitable application, in addition to those described with respect to the vehicle 10 or instead of those described with respect to the vehicle 10.

In some embodiments, as is generally illustrated in FIGS. 4A, 4B, 4C, 5, and 6, the central bore 424 may be defined by an anti-rotation feature 410 the body 408. The anti-rotation feature 410 may configured to align the plurality of leads 412 with the mounting locations 420 of by engaging a corresponding portion 418 of the PCB 414. The portion 418 of the PCB 414 may include an opening or bore that allows the anti-rotation feature to pass through the PCB 414.

Figure 6:
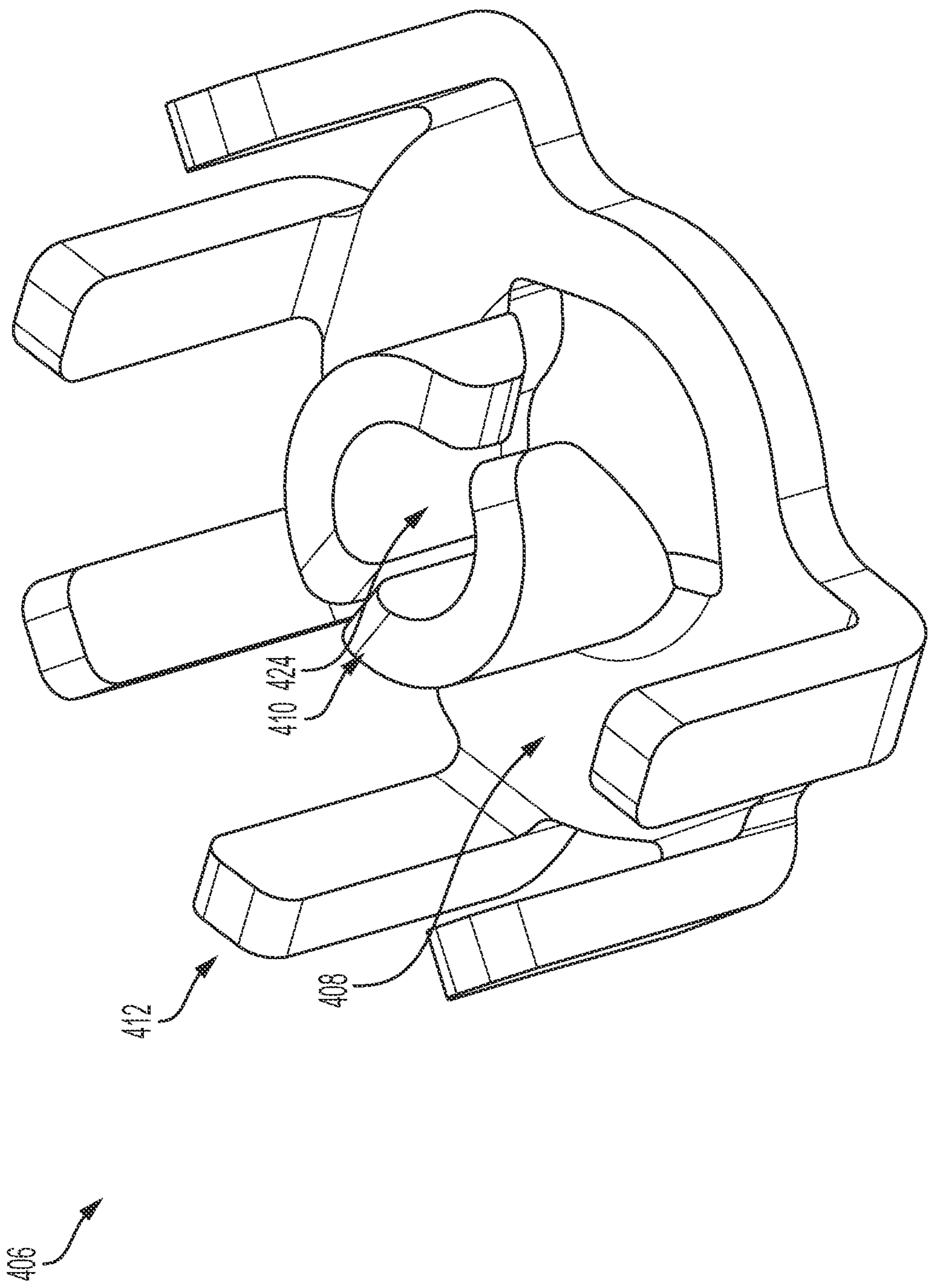
FIG. 6 generally illustrates another alternative view of the terminal of FIGS. 4A-4C.
Figure 8:
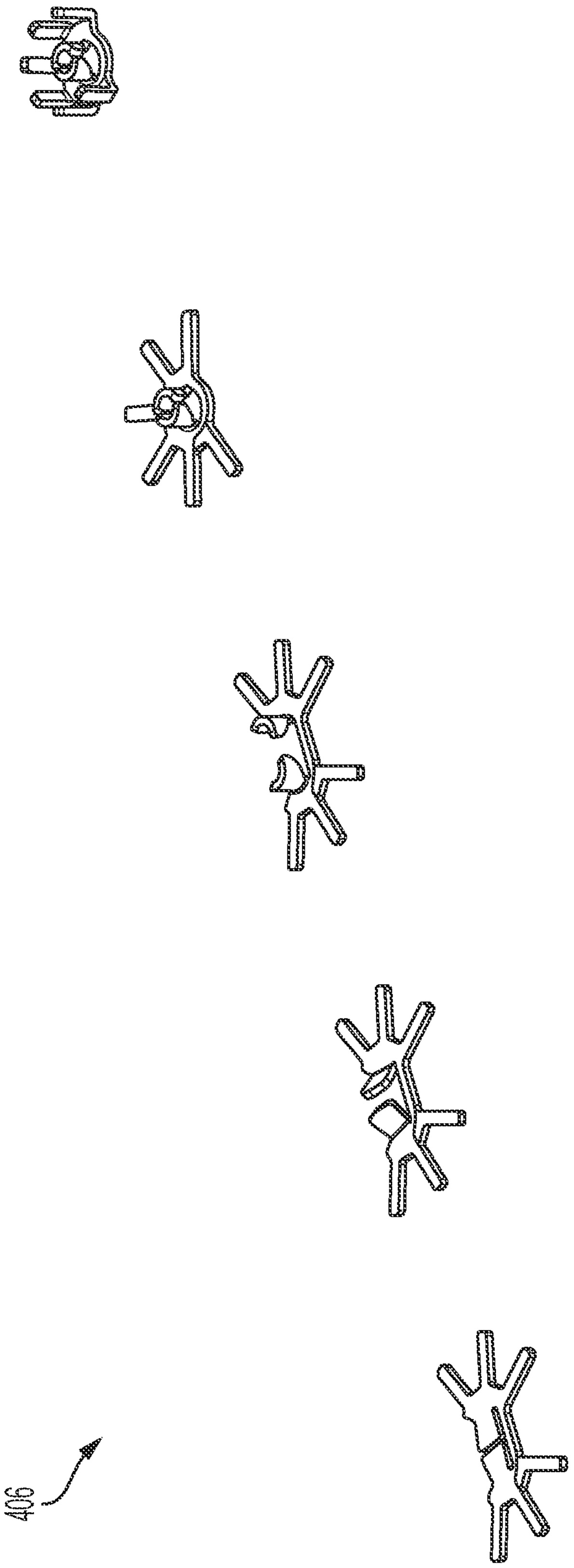
FIG. 8 generally illustrates shaping or forming steps of a terminal according to the principles of the present disclosure.
Figure 9:
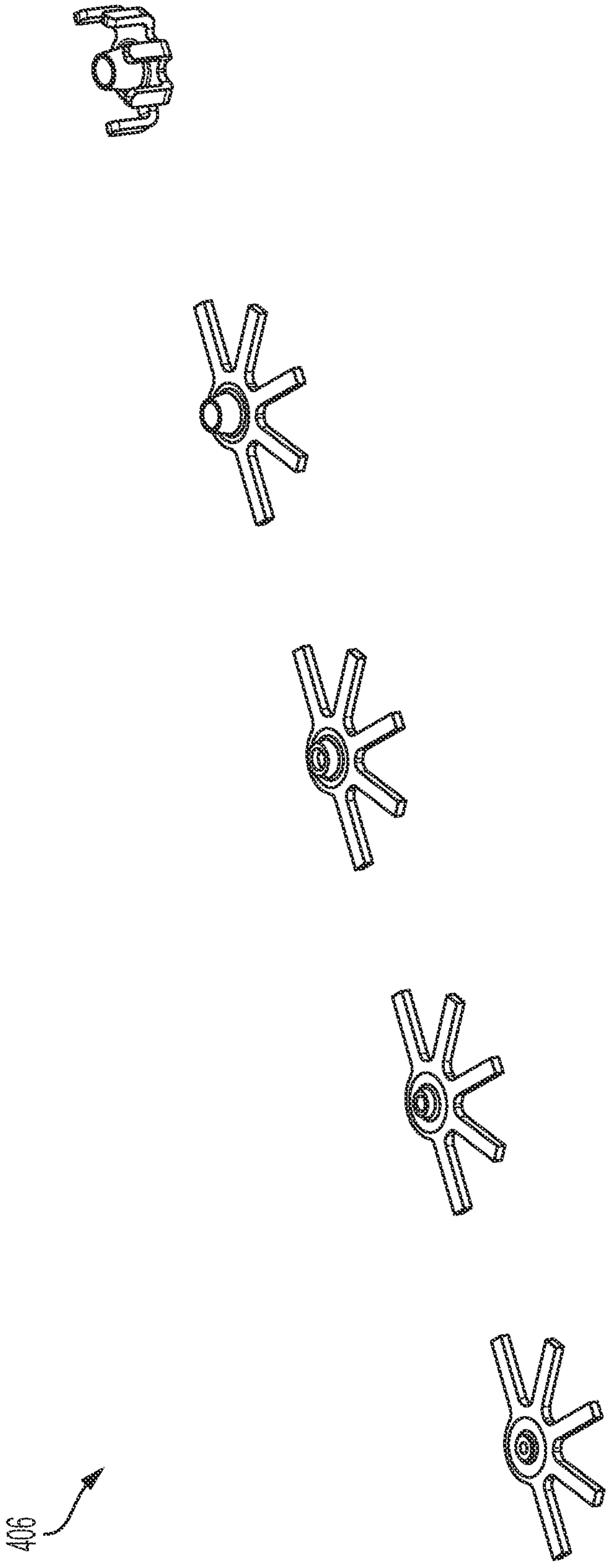
FIG. 9 generally illustrates alternative shaping or forming steps of a terminal according to the principles of the present disclosure.

In some embodiments, the terminal 406, as is generally illustrated in FIG. 6 may comprise a unitary component comprising the body 408, the plurality of leads 412, the anti-rotation feature 410, and the central bore 424. The terminal 406 may comprise any suitable material include copper, copper alloys, brass, bronze, gold, nickel, tin, and the like. With reference to FIGS. 8 and 9, the terminal 406 may be shaped from a single piece of material in the manner generally illustrated. The terminal 406 may be bent, punched, extruded, rolled, sanded, heat treated, and the like to form the shape of the terminal 406. It should be understood that the terminal 406 may be manufactured in any suitable manner using any suitable technique.

Figure 7B:
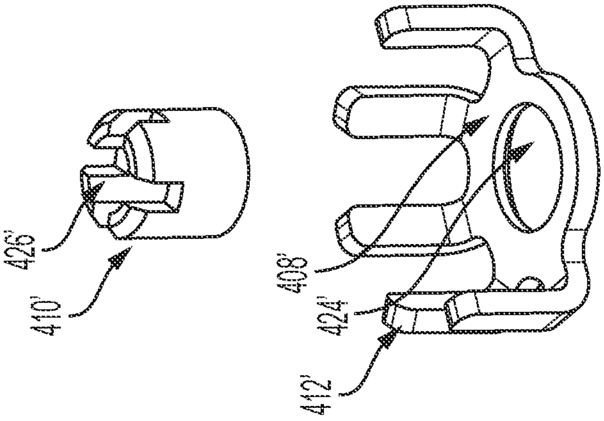
FIGS. 7A and 7B generally illustrate an alternative terminal according to the principles of the present disclosure.
Figure 7A:
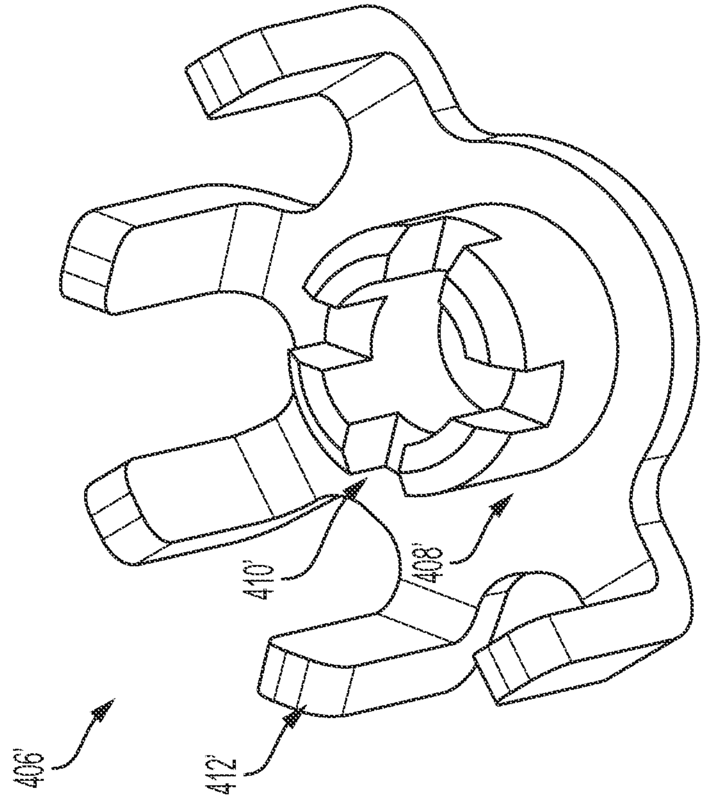

In some embodiments, as is generally illustrated in FIGS. 7A and 7B, an alternative terminal 406' may comprise two or more components. For example, the terminal 406' may include a first component comprising a body 408', a plurality of leads 412', and a first central bore 424'. The terminal 406' may include a second component comprising an anti-rotation feature 410' and a second central bore 426' defined by the anti-rotation feature 410'. Each of the first component and the second component may comprise any suitable material include copper, copper alloys, brass, bronze, gold, nickel, tin, the like, and/or any suitable combination thereof. It should be understood that the terminal 406' may be manufactured in any suitable manner using any suitable technique.

In some embodiments, a terminal for a printed circuit board includes a body and a plurality of leads extending from the body at an angle between 180 degrees and 90 degrees relative to a horizontal plane of the body, each lead of the plurality of leads being configured to: mate with a corresponding mounting locations on the printed circuit board; and receive current from at least one electrical component associate with the printed circuit board, wherein the current flows from the at least one electrical component via the plurality of leads to at least one other electrical component.

In some embodiments, the at least one electrical component includes a power supply. In some embodiments, the at least one other electrical component includes a choke inductor. In some embodiments, the at least other electrical component includes a capacitor. In some embodiments, the plurality of leads includes six leads. In some embodiments, the printed circuit board is associated with an on board charger associated with a vehicle battery. In some embodiments, the printed circuit board is associated with a direct current to direct current converter. In some embodiments, the printed circuit board is associated with an inverter. In some embodiments, the body includes an anti-rotation feature of the body, and wherein the anti-rotation feature is configured to align the plurality of leads with the mounting locations of the printed circuit board by engaging a corresponding portion of the printed circuit board. In some embodiments, the body, the plurality of leads, and the anti-rotation feature comprise a unitary component.

In some embodiments, a system includes a printed circuit board that includes a plurality of mounting locations, a body and a plurality of leads extending from the body at an angle between 180 degrees and 90 degrees relative to a horizontal plane of the body. Each lead of the plurality of leads is configured to: mate with respective mounting locations of the plurality of mounting locations on the printed circuit board; and receive current from at least one electrical component associate with the printed circuit board, wherein the current flows from the at least one electrical component via the plurality of leads to at least one other electrical component.

In some embodiments, the at least one electrical component includes a power supply. In some embodiments, the at least one other electrical component includes a choke inductor. In some embodiments, the at least other electrical component includes a capacitor. In some embodiments, the plurality of leads includes six leads. In some embodiments, the printed circuit board is associated with an on board charger associated with a vehicle battery. In some embodiments, the printed circuit board is associated with a direct current to direct current converter. In some embodiments, the printed circuit board is associated with an inverter. In some embodiments, the body includes an anti-rotation feature of the body, and wherein the anti-rotation feature is configured to align the plurality of leads with the mounting locations of the printed circuit board. In some embodiments, the body, the plurality of leads, and the anti-rotation feature comprise a unitary component.

In some embodiments, an apparatus includes a body that includes at least one anti-rotation feature configured to engage a corresponding portion of a printed circuit board. The apparatus also includes a plurality of leads extending from the body and configured to: mate with corresponding mounting locations on the printed circuit board; and receive current from at least one electrical component associate with the printed circuit board, wherein the current flows from the at least one electrical component via the plurality of leads to at least one other electrical component.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A terminal for a printed circuit board, the terminal comprising:
- a body; and
- a plurality of leads, wherein each lead of the plurality of leads includes a first segment-extending from the body and a second segment extending at a 90 degree angle from the first segment, such that the second segment is perpendicular relative to a horizontal plane of the body, each lead of the plurality of leads being configured to:
  - mate with a corresponding mounting location on the printed circuit board; and
  - receive current from at least one electrical component associated with the printed circuit board, wherein the current flows from the at least one electrical component via the plurality of leads to at least one other electrical component.

2. The terminal of claim 1, wherein the at least one electrical component includes a power supply.

3. The terminal of claim 1, wherein the at least one other electrical component includes a choke inductor.

4. The terminal of claim 1, wherein the at least other electrical component includes a capacitor.

5. The terminal of claim 1, wherein the plurality of leads includes six leads.

6. The terminal of claim 1, wherein the printed circuit board is associated with an onboard charger associated with a vehicle battery.

7. The terminal of claim 1, wherein the printed circuit board is associated with a direct current to direct current converter.

8. The terminal of claim 1, wherein the printed circuit board is associated with an inverter.

9. The terminal of claim 1, wherein the body includes an anti-rotation feature, and wherein the anti-rotation feature is configured to align the plurality of leads with the mounting locations of the printed circuit board by engaging a corresponding portion of the printed circuit board.

10. The terminal of claim 9, wherein the body, the plurality of leads, and the anti-rotation feature comprise a unitary component.

11. A system comprising:
- a printed circuit board that includes a plurality of mounting locations;
- a body; and
- a plurality of leads, wherein each lead of the plurality of leads includes a first segment extending from the body and a second segment extending at a 90 degree angle from the first segment such that the second segment is perpendicular relative to a horizontal plane of the body, each lead of the plurality of leads being configured to:
  - mate with respective mounting locations of the plurality of mounting locations on the printed circuit board; and
  - receive current from at least one electrical component associated with the printed circuit board, wherein the current flows from the at least one electrical component via the plurality of leads to at least one other electrical component.

12. The system of claim 11, wherein the at least one electrical component includes a power supply.

13. The system of claim 11, wherein the at least one other electrical component includes a choke inductor.

14. The system of claim 11, wherein the at least other electrical component includes a capacitor.

15. The system of claim 11, wherein the plurality of leads includes six leads.

16. The system of claim 11, wherein the printed circuit board is associated with an onboard charger associated with a vehicle battery.

17. The system of claim 11, wherein the printed circuit board is associated with a direct current to direct current converter.

18. The system of claim 11, wherein the printed circuit board is associated with an inverter.

19. The system of claim 11, wherein the body includes an anti-rotation feature, and wherein the anti-rotation feature is configured to align the plurality of leads with the mounting locations of the printed circuit board.

20. An apparatus comprising:
- a body that includes at least one anti-rotation feature configured to engage a corresponding portion of a printed circuit board; and
- a plurality of leads, wherein each lead of the plurality of leads includes a first segment extending from the body and a second segment extending at a 90 degree angle from the first segment such that the second segment is perpendicular to a horizontal plane of the body, each lead of the plurality of leads being configured to:
  - mate with corresponding mounting locations on the printed circuit board; and
  - receive current from at least one electrical component associated with the printed circuit board, wherein the current flows from the at least one electrical component via the plurality of leads to at least one other electrical component.

* * * * *